(12) United States Patent
Schroeder et al.

(10) Patent No.: US 9,626,634 B2
(45) Date of Patent: Apr. 18, 2017

(54) INDUSTRIAL PLANT EQUIPMENT, PROCESS AND MAINTENANCE OPTIMIZATION

(75) Inventors: John P. Schroeder, Worthington, OH (US); Eric Mulders, Etten-Leur (NL)

(73) Assignee: ABB Schweiz AG, Baden (CH)

( * ) Notice: Subject to any disclaimer, the term of this patent is extended or adjusted under 35 U.S.C. 154(b) by 916 days.

(21) Appl. No.: 13/611,507

(22) Filed: Sep. 12, 2012

(65) Prior Publication Data
US 2014/0074260 A1 Mar. 13, 2014

(51) Int. Cl.
*G06Q 10/06* (2012.01)
*G05B 19/418* (2006.01)

(52) U.S. Cl.
CPC ....... *G06Q 10/06* (2013.01); *G05B 19/41865* (2013.01); *Y02P 90/14* (2015.11); *Y02P 90/20* (2015.11)

(58) Field of Classification Search
CPC ............................................ G05B 2219/35507
USPC .................................................... 703/73, 108
See application file for complete search history.

(56) References Cited

U.S. PATENT DOCUMENTS

| | | | |
|---|---|---|---|
| 3,951,459 A * | 4/1976 | Honeycutt, Jr. ........ | E21F 13/04 299/11 |
| 6,327,571 B1 * | 12/2001 | Khayat et al. ............... | 705/7.32 |
| 6,845,278 B2 * | 1/2005 | Popp et al. ................... | 700/108 |
| 6,857,014 B1 * | 2/2005 | Paterson ............. | H04L 41/0659 709/221 |
| 6,909,990 B2 | 6/2005 | Okazaki et al. | |
| 6,934,663 B2 | 8/2005 | Bjornson | |
| 7,398,184 B1 * | 7/2008 | Chen ............................. | 702/182 |
| 7,406,399 B2 | 7/2008 | Furem et al. | |
| 8,612,029 B2 * | 12/2013 | Cottrell .............. | G05B 23/0229 340/10.1 |
| 8,972,067 B2 * | 3/2015 | Holt et al. ..................... | 700/286 |
| 2002/0143241 A1 * | 10/2002 | Thorell ......................... | 600/300 |
| 2002/0143421 A1 * | 10/2002 | Wetzer .................. | G06Q 10/06 700/100 |
| 2004/0133397 A1 * | 7/2004 | Bjornson ...................... | 702/185 |
| 2005/0081410 A1 * | 4/2005 | Furem et al. .................. | 37/379 |

(Continued)

FOREIGN PATENT DOCUMENTS

EP 1719603 * 11/2006 ........... G05B 19/409

OTHER PUBLICATIONS

Mitchell, "Physical Asset Management handbook", 2002, http://www.reliabilityweb.com/excerpts/excerpts/PAM-ch6.pdf, pp. 1-24.*

(Continued)

*Primary Examiner* — Kenneth M Lo
*Assistant Examiner* — Olvin Lopez Alvarez
(74) *Attorney, Agent, or Firm* — Taft Stettinius & Hollister LLP (57) ABSTRACT

A method includes obtaining at least first, second and third data corresponding to an industrial plant, wherein the first data is indicative of a performance of equipment of the industrial plant, the second data is indicative of a process of the industrial plant, and third data is indicative of a reliability of the industrial plant, analyzing the first, second and third data with respect to predetermined metrics of the industrial plant, and generating a signal indicative of a recommendation for at least one of use of the equipment or implementation of the process based on a result of the analyzing.

27 Claims, 5 Drawing Sheets

(56) References Cited

U.S. PATENT DOCUMENTS

| | | | |
|---|---|---|---|
| 2005/0192963 A1* | 9/2005 | Tschiegg et al. | 707/9 |
| 2005/0251432 A1* | 11/2005 | Barker et al. | 705/7 |
| 2006/0080014 A1* | 4/2006 | Di Palma et al. | 701/41 |
| 2006/0229799 A1* | 10/2006 | Nimmo | G08G 1/20 701/117 |
| 2007/0035398 A1* | 2/2007 | Vesel | G05B 23/0267 340/572.1 |
| 2008/0270078 A1* | 10/2008 | Fluegge | G06Q 10/06 702/186 |
| 2008/0294771 A1* | 11/2008 | Hermes | G05B 23/0267 709/224 |
| 2009/0012653 A1* | 1/2009 | Cheng et al. | 700/287 |
| 2009/0113049 A1* | 4/2009 | Nasle | G05B 13/026 709/224 |
| 2009/0149972 A1* | 6/2009 | Nasle | G05B 17/02 700/80 |
| 2010/0147111 A1* | 6/2010 | Skiles | B03D 1/02 75/392 |
| 2011/0022192 A1 | 1/2011 | Plavhe et al. | |
| 2011/0190918 A1* | 8/2011 | Virgil | G06F 19/00 700/105 |
| 2011/0218912 A1* | 9/2011 | Shivers | G06Q 20/108 705/42 |
| 2012/0143644 A1* | 6/2012 | Baron | 705/7.13 |
| 2012/0283885 A1* | 11/2012 | Mannar | G05B 23/024 700/286 |
| 2014/0214183 A1* | 7/2014 | Mast et al. | 700/32 |

OTHER PUBLICATIONS

Cipriano et al, "A Real Time Visual Sensor for Supervision of Flotation Cells", 1998, pp. 489-499.*

SKF, "Maintenance, reliability and asset optimization Technologies and services from SKF", Jun. 2011, pp. 11.*

SKF, "The Guide to Asset Efficiency Optimization Fro Improved Profitabilty", Jun. 2010, pp. 60.*

ABB, "Special Report Process Automation Services & Capabilities", 2008, pp. 92.*

ABB, "monitoring and Optimizing Power Generation Assets", https://library.e.abb.com/public/bf5234f0a45a9ac0c1257480002de1fc/incontrol_2007-01_E.pdf, May 2007, pp. 8.*

SEMATECH, "Failure Reporting, Analysis, and Corrective Action System, FRACAS", 1994, pp. 42.*

ABB, "Optimax® Plant Optimization Solutions for Power Generation", 2006, https://library.e.abb.com/public/e15f7798384e6f02852573a3004c9a5a/Plant_Optimization_S_DEABB_1291_06_E.pdf, pp. 8.*

SKF, "2011 SKF Training Handbook a comprehensive reliability and maintenance skills training program from SKF", 2011, pp. 10.*

Meyer, et al., SMART Mine Benchmarking—Pilot to the Future, Albian Sands Energy Inc., Marston Canada Ltd. (2004), http://www.cim.org/en/Publications-and-Technical-Resources/Publications/Proceedings/2004/5/PROC-2004-05-01/PROC-2004-05-104. (pp. 1-8).

Ivara Corporation, Mining Excellence Strategies: Driving Mining Profitability With Optimized Equipment Performance, A whitepaper by Ivara Corporation (2008), http://www.ivara.com/content/pdfs/Ivara_Mining_Excellence_WhitePaper.pdf, (pp. 1-11).

Sandy Dunn, Benchmarking as a Maintenance Performance Measurement and Improvement Technique, Assetivity Pty Ltd, 2003, http://www.plant-maintenance.com/articles/Maintenance_Benchmarking.pdf. (pp. 1-11).

* cited by examiner

INDUSTRIAL PLANT EQUIPMENT, PROCESS AND MAINTENANCE OPTIMIZATION

BACKGROUND

The following generally relates to industrial plant process automation optimization and is described with particular application to a mineral plant; however, the following is also amenable to other industrial plants.

Mining, generally, is the extraction of a material from the earth. Examples of materials that are mined from the earth include, but are not limited to, metal such as copper, iron, uranium, coal, diamonds, limestone, oil shale, rock salt, potash, petroleum, natural gas, water, and/or other material. Such materials may be contained in an orebody, lode, vein, seam or reef, which forms the mineralized horizon. Copper mining will be discussed next in more detail as an example of a mining process.

Copper mining includes extracting copper ore from the earth and then extracting the copper from the ore. This conversion consists of a series of chemical, physical, and electrochemical processes. For example, the ore is first crushed. Then it is roasted to convert sulfides to oxides, which are smelted to produce matte. Finally, it undergoes various refining processes, the final one being electrolysis. For economic and environmental reasons, many of the byproducts of extraction are reclaimed.

More specifically, copper ores are often obtained from large open-pit mines by drilling and blasting with explosives. The material located above the ore is first removed to expose the buried ore deposit. The copper ore is removed and loaded into a transportation vehicle, called a haul truck, and is transported up and out of the pit. The copper typically contains a large amount of dirt, clay, and a variety of non-copper bearing minerals.

From the literature, the first step to extracting the copper is to remove some of the non-copper material. Examples of approaches for doing so include, but at not limited to, crushing the copper ore with a series of cone crushers, which consists of an interior grinding cone that rotates on an eccentric vertical axis inside a fixed outer cone. As the ore is fed into the top of the crusher, it is squeezed between the two cones and broken into smaller pieces.

The crushed ore is then ground even smaller by a series of mills. First, it is mixed with water and placed in a rod mill, which consists of a large cylindrical container filled with numerous short lengths of steel rod. As the cylinder rotates on its horizontal axis, the steel rods tumble and break up the ore into smaller pieces. The mixture of ore and water is further broken up in two ball mills. The slurry of finely ground ore that emerges from the final ball mill contains particles about 0.01 in (0.25 mm) in diameter.

The slurry is mixed with various chemical reagents, which coat the copper particles. A frother (e.g., pine oil or long-chain alcohol) are added, and the mixture is pumped into rectangular tanks where air is injected into the slurry through the bottom of the tanks. The chemical reagents make the copper particles cling to the bubbles as they rise to the surface. The frother forms a thick layer of bubbles, which overflows the tanks and is collected in troughs. The bubbles are allowed to condense and the water is drained The copper concentrate is fed into an oxygen-enriched flash furnace along with a silica material flux. Iron chemically combines with the flux to form a slag and is skimmed off, and sulfur combines with the oxygen and is exhausted. Generally, this process is repeated and the resulting molten material contains a higher concentration of copper by weight. The molten material is then refined and cast into ingots, cakes, billets, or rods depending on the final application.

However, the mining process is confronted with various challenges. Such challenges include maximizing output, which includes ending up with a predetermined threshold concentration of copper in the refined final product considering the initial ore may include less than 1.0% of the material of interest. Other challenges include mitigating environmental, health and/or safety concerns, minimizing down time, reducing energy cost, optimizing allocation of recourses, getting properly trained individuals to remotely located mines, etc. Thus, there is an unresolved need for improving the mining process.

SUMMARY

Aspects of the present application address these matters, and others.

According to one aspect, a method includes obtaining at least first, second and third data corresponding to an industrial plant, wherein the first data is indicative of a performance of equipment of the industrial plant, the second data is indicative of a process of the industrial plant, and third data is indicative of a reliability of the industrial plant, analyzing the first, second and third data with respect to predetermined metrics of the industrial plant, and generating a signal indicative of a recommendation for at least one of use of the equipment or implementation of the process based on a result of the analyzing.

According to another aspect, a system includes a data collector that obtains at least first, second and third data corresponding to an industrial plant, wherein the first data is indicative of a performance of equipment of the industrial plant, the second data is indicative of a process of the industrial plant, and third data is indicative of a reliability of the industrial plant, a data analyzer that analyzes the first, second and third data with respect to predetermined metrics of the industrial plant, and a recommender that generates a signal indicative of a recommendation for at least one of use of the equipment or implementation of the process based on a result of the analyzing.

According to another aspect, a computer readable storage medium is encoded with one or more computer executable instructions, which, when executed by a processor of a computing system, causes the processor to: obtain at least first, second and third data corresponding to an industrial plant, wherein the first data is indicative of a performance of equipment of the industrial plant, the second data is indicative of a process of the industrial plant, and third data is indicative of a reliability of the industrial plant, analyze the first, second and third data with respect to predetermined metrics of the industrial plant, and generate a signal indicative of a recommendation for at least one of use of the equipment or implementation of the process based on a result of the analyzing.

Those skilled in the art will appreciate still other aspects of the present application upon reading and understanding the attached figures and description.

FIGURES

The present application is illustrated by way of example and not limitation in the figures of the accompanying drawings, in which like references indicate similar elements and in which.

DESCRIPTION

The following relates to industrial plant process automation optimization and is described in connection with a minerals plant. However, the following is not limited to minerals plants but is also amenable to other plants in other industries such as pulp & paper, oil & gas, chemical, metal, petrochemical, power utilities, water utilities, and renewable energy and/or other industries. The optimization, in one instance, allows for maximizing equipment life, optimizing processes, and/or improving reliability.

Figure 1:
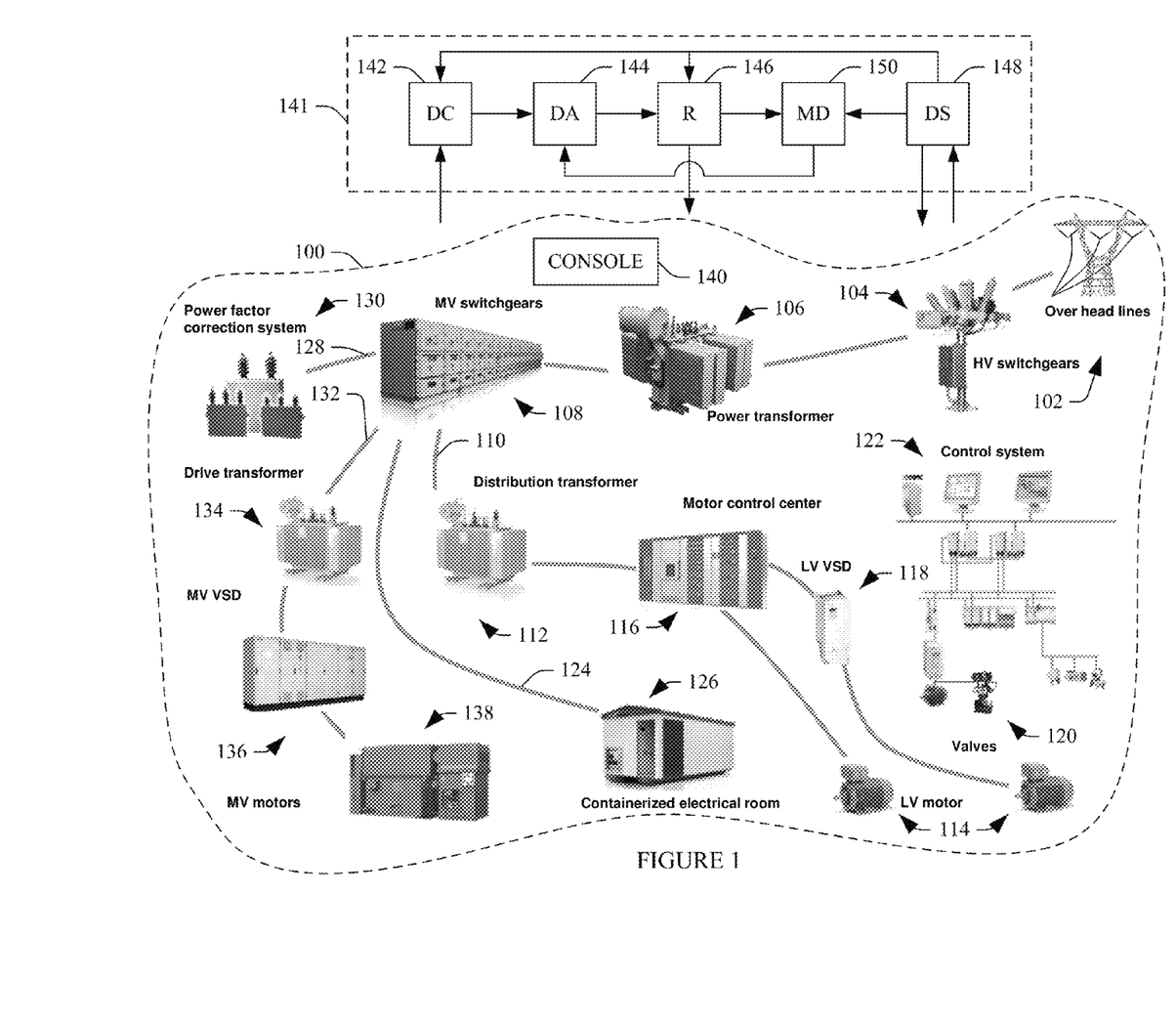
FIG. 1 illustrates an example industrial plant in connection with an industrial plant optimization system.

Initially referring to FIG. 1, an example minerals plant 100 is illustrated. It is to be understood that this particular example is not limiting and other configuration are also contemplated herein. Power for the plant 100, in the illustrated example, is supplied from overhead power lines 102. Power therefrom is received by high voltage switchers 104, which supplies power to a power transformer 106. Power from the power transformer 106 is fed to a mega-voltage switcher 108, which supplies power to various chains of the plant 100.

A first chain 110 includes a distribution transformer 112 that supplies power to one or more low voltage motors 114 via a motor control center 116 and/or one or more low voltage variable speed drives 118. One or more valves 120 of the first chain 110 are controlled by a computer based control station 122. A second chain 124 includes a contained electrical room 126. A third chain 128 includes a power factor corrector 130. A further chain 132 includes a drive transformer 134, a megavolt variable speed drive 136, and one or more megavolt motors 138.

The plant 100 includes a console 140 that can communicate with one or more of the components of the plant 100. The console 140 can also communicate with one or more of the devices external to the plant 100. Such communication can be through wired and/or wireless approaches. In addition, the console 140 includes an input device(s) such as a mouse, keyboard, etc. and an output device(s) such as a display monitor, a printer, etc. which allows for user interaction with the console 140.

An optimization system 141 includes a data collector (DC) 142 that collects information about the plant 100. Such information includes equipment based information, production process based information and reliability information, and, optionally, energy, safety, environmental, etc. information. In one instance, this includes conveying a query in an electronic format such as an electronic document or the like to the console 140 and receiving a result in an electronic format. The query can be electronically conveyed to the plant 100 and/or the result can be electronically conveyed to the data collector 142 via a network, a cable, portable memory, etc.

In a variation, this data is obtained through a series of questions of a questionnaire, which may include a predetermined set of possible answers which to choose from. The questions may pertain to how well is equipment being maintained in a certain area, how well is the equipment being maintained, safety, training of people, etc., how well is the control performance, how well can they perform on their strategy, etc. The output can be used to define customer strengths and weaknesses and recommendation for improvement.

The industrial plant 100 answers the questions and returns them to the data collector 142. The query and/or the questionnaire can be tailored to a specific piece of equipment and/or process, equipment and/or processes in general, and/or a particular industrial plant.

Examples of equipment based information include, but are not limited to, information about uptime, speed, efficiency, hardware components, software revisions, spare parts compliment, life cycle status, etc. Examples of production process based information include, but are not limited to, information about overall equipment effectiveness (OEE), down time, control loop goodness, process interrupts, etc. Examples of reliability based information include, but is not limited to, information about work practices, organization, culture, etc.

Examples of data requested include, but are not limited to, data related to preventive strategy, emergency strategy, proactive strategy, life cycle strategy, hardware, software, training, availability and support, personnel, variability, data availability, data quality, etc. For example, for prevention strategy for a piece of equipment, the requested data may correspond to the last inspection was performed, the preventive maintenance schedule, the ratio of preventive maintenance to un-schedule corrective maintenance, replacement parts, etc.

The optimization system 141 further includes a data analyzer (DA) 144 that analyzes the results of the query and/or questionnaire. The results can be analyzed by themselves and/or in connection with results of previous queries to the same plant 100 and/or one or more other plants, including a same type of plant and/or a different type of plant. The results may also be analyzed in connection with industry standards, plant specific standards, standards of a particular plant, etc. The data analysis can also be considered as benchmarking based on the data collected for equipment, process, and reliability.

The optimization system 141 further includes a recommender (R) 146 generates a recommendation based on the analysis. The recommendation can be in the form of an electronic document and include a report detailing and/or summarizing the information collected, the information analyzed, and the basis for the recommendation. The report may include information identifying opportunities for maximizing equipment lifecycle, optimizing process performance, and/or delivering reliability improvements.

The report may also compare candidate recommendations in view of the current state of the process. As example comparison is shown in the spider chart 200 of FIG. 2. Note that the illustrated spider chart 200 is for a control system and includes generic indices (e.g., emergency strategy, prevention strategy, life cycle strategy, personnel) as well as control system specific indices (e.g., I/O, network/controller, human system interface (HSI)). Spider charts for other systems may include similar and/or different indices.

Figure 2:
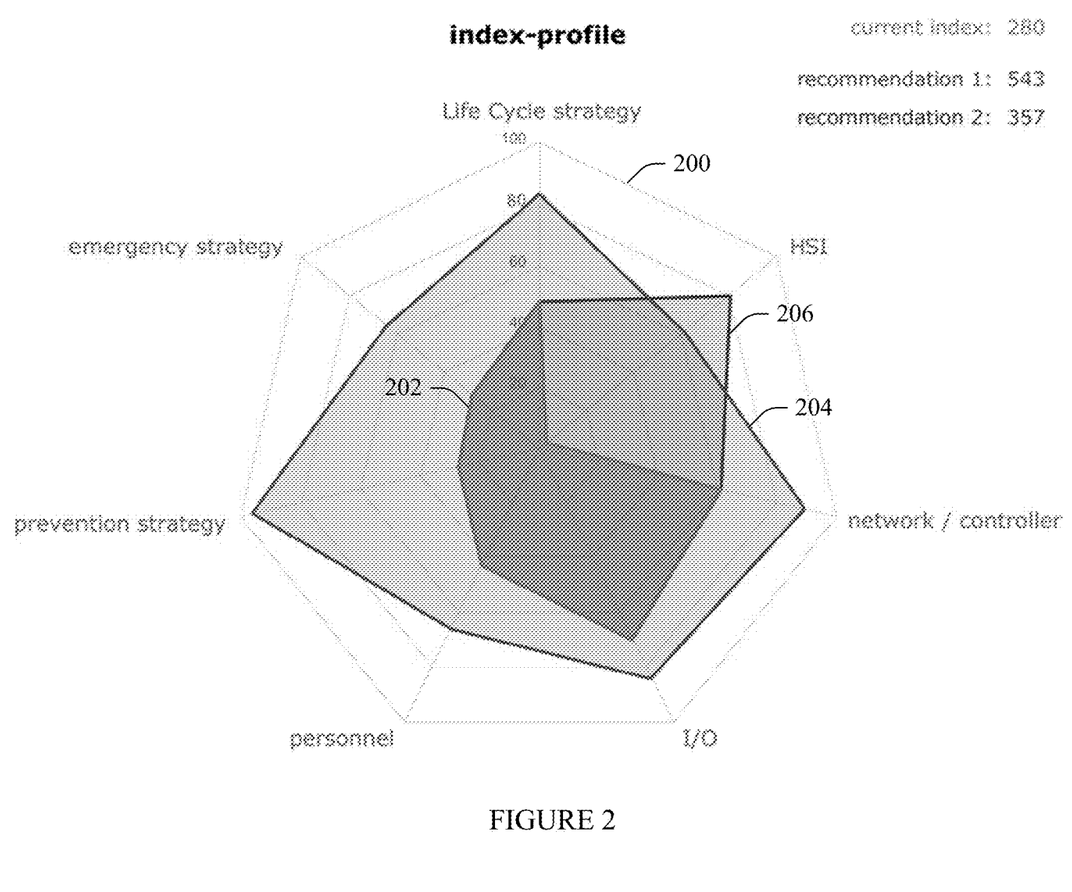
FIG. 2 illustrates example index profile spider charts for a particular control system.

The spider chart 200 shows a first profile 202, which corresponds to the current state of the control system. In this example, the index for the first profile 202 is 280. A second profile 204 corresponds to a primary recommendation, which has an index of 543. As shown, the primary recommendation is projected to improve all indices. A third profile 206 corresponds to a secondary recommendation, which has an index of 357. As shown, the secondary recommendation is projected to improve the human system interface index.

Indexes such as preventive maintenance strategy, emergency maintenance strategy, training, predictive maintenance strategy index, support availability index, life cycle strategy index etc. can be presented per equipment class for a plant. Indexes can also be presented per Index type (e.g., preventive maintenance strategy, etc.) between equipment classes for a plant.

Indexes such as preventive maintenance strategy, emergency maintenance strategy, training, predictive maintenance strategy index, support availability index, life cycle strategy index etc. can also be presented per equipment class for multiple plants for a single or multiple customers. Indexes can also be presented per Index type (e.g., preventive maintenance strategy, etc.) between equipment classes for multiple plants for a single or multiple customers.

Specific product specific technology indices includes, but are not limited to, Gearless Mill Drive, which includes at least the following specific technology indices: Ring Motor, Converter, Switchgear&Transformer, E-House, Motor Control Center, and Automation. It is to be appreciated the above is just an example, as these can vary for each product.

The indexing approach is based on unique equipment specific data collection techniques and kpi's. This includes adapting approaches used for other systems such as control systems. In addition, using this unique, repeatable approach may provide the capability to collect "like" information from multiple plants, enabling findings such as benchmarking capabilities between plants, regions, industries, etc.

Figure 3:
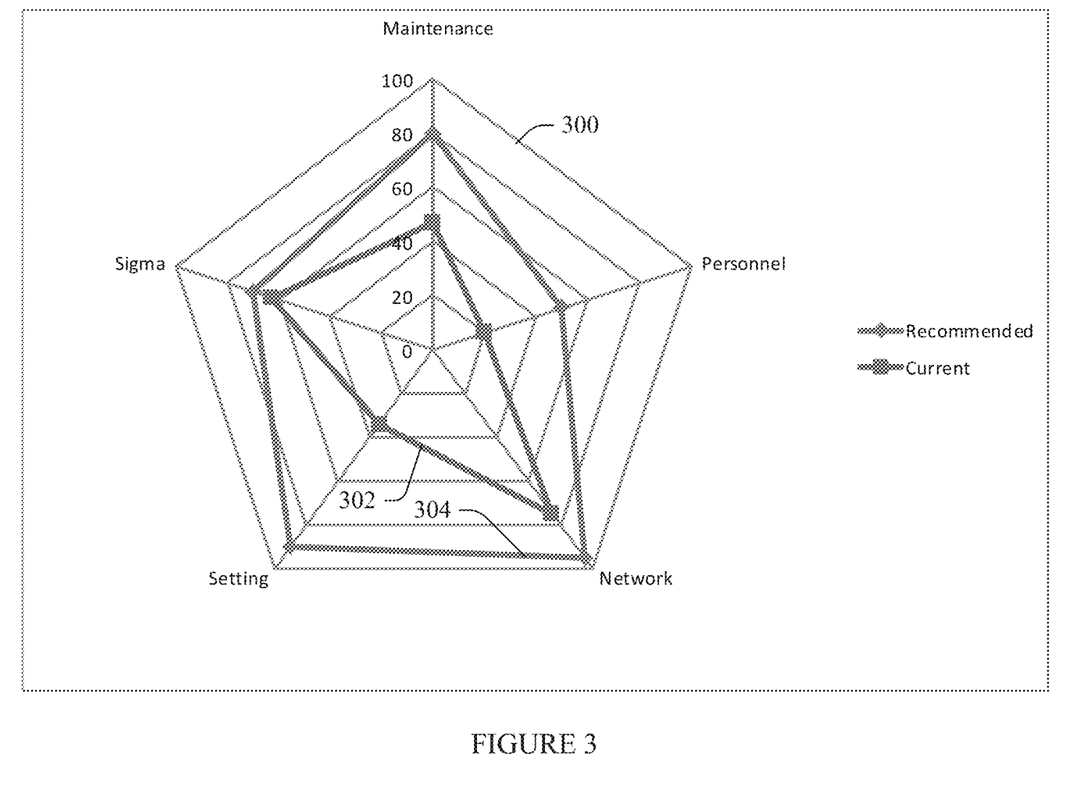
FIG. 3 illustrates example index profile spider charts for control performance assessment.
Figure 4:
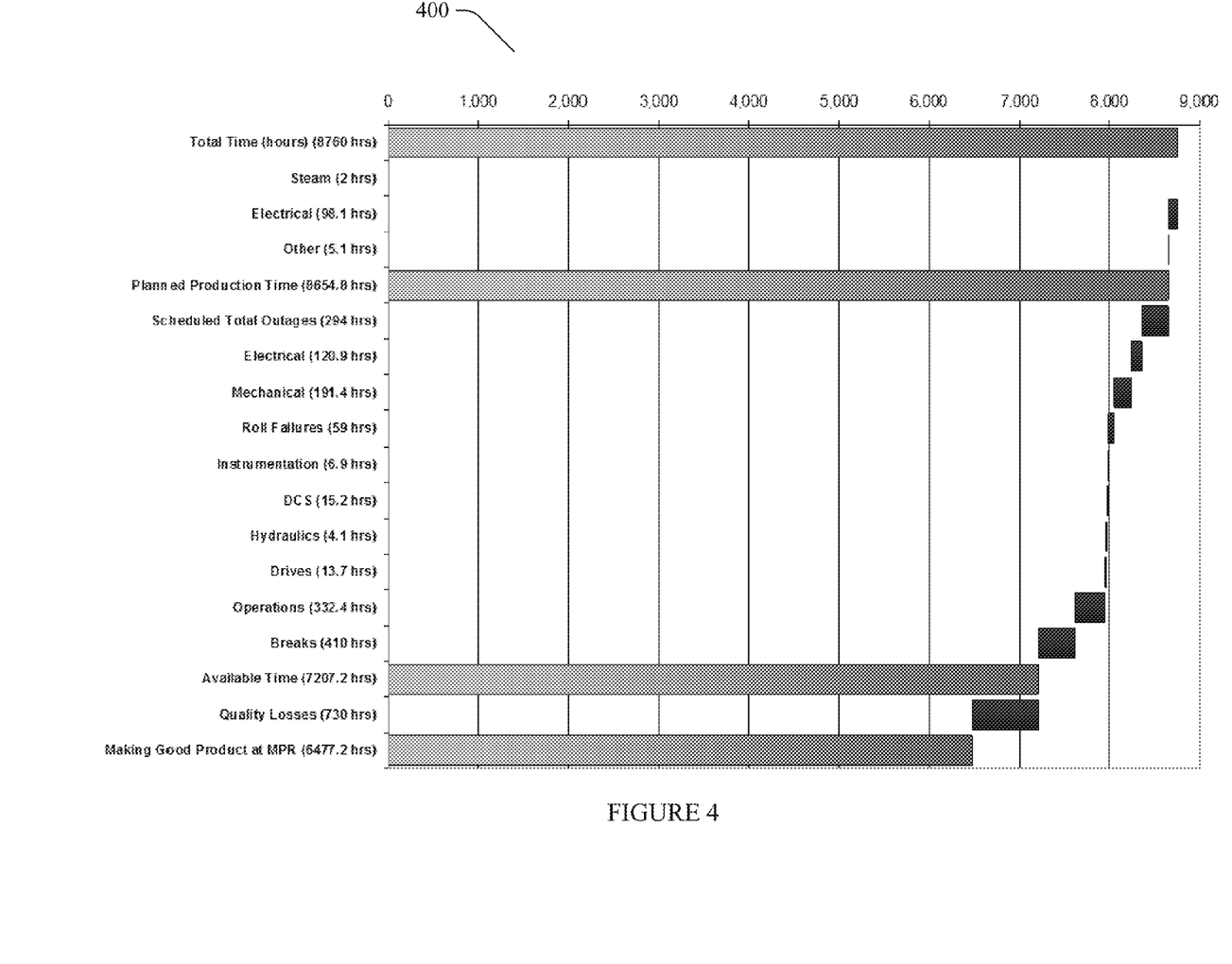
FIG. 4 illustrates an overall equipment effectiveness chart.

FIG. 3 shows a spider chart 300 for control performance assessment. The indices in the chart 300 include settings, maintenance, personnel, network and sigma. A first profile 302 shows the current state, and a second profile 304 shows a recommendation, which includes improvement to all of the indices. Again, the spider charts discussed herein are not limiting and are provided for explanatory purposes. FIG. 4 shows an OEE report 400, which shows an itemized list or breakdown of total time.

Returning to FIG. 1, the recommendations generally include recommendations for maintenance improvement recommendations for at least one of equipment, process performance, or reliability. Examples of equipment recommendations include a recommendation for at least one of training, support, preventive maintenance, etc. Examples of process performance recommendations include a recommendation for at least one of control effectiveness, rate, or downtime. Examples of reliability recommendations include a recommendations for at least one of maintenance process or maintenance strategy.

The recommendation can be conveyed, via a signal and/or hardcopy, from the recommender 146 to the console 140 of the plant 100, which can visually present the report via a display monitor (or print the report to hard copy) for user observation by a technician and/or other authorized personnel and/or automatically control one or more components of the plant 100 based thereon. Where the report is visually displayed, the technician and/or robot can effectuate control one or more components of the plant 100 based thereon.

The plant 100 can either implement the recommendations (in part or in full) by themselves or with third party involvement, or not. It is to be appreciated that the recommendations may provide one or more of: raise production availability (e.g., 5% or more), extend equipment life at a cost lower than that of new equipment (e.g., $1/10^{th}$ the cost), optimize process performance, improve productivity (e.g., by 5% or more), cut energy costs (e.g., by 5% or more), increase overall equipment effectiveness (e.g., by 2-5%).

The optimization system 141 further includes a data scanner 148 that scans the plant 100 based on a predetermined schedule (e.g., each quarter, each month, etc.) and/or on demand. The resulting data can be conveyed to the data collector 142 and processed as described above and/or compared with the recommendation to determine whether a recommended action has been implemented and/or implemented properly. Memory device 150 stores collected data, analysis results, recommendations, scanned data, and/or other information.

The outcome of the analysis and/or monitoring may include maximizing output, ensuring compliance with environmental, health and/or safety standards, mitigating overallocating of resources, ensuring proper personnel and utilization thereof, minimizing downtime, reducing energy cost, etc.

It is to be appreciated that one or more of the components 142, 144, 146 and/or 148 can be implemented via one or more processors that execute one or more computer readable instructions encoded, embedded, stored, etc. on computer readable storage medium such as physical memory and/or other non-transitory memory. Additionally or alternatively, at least one of the computer readable instructions may be carried by a signal, carrier wave and/or other transitory medium.

Figure 5:
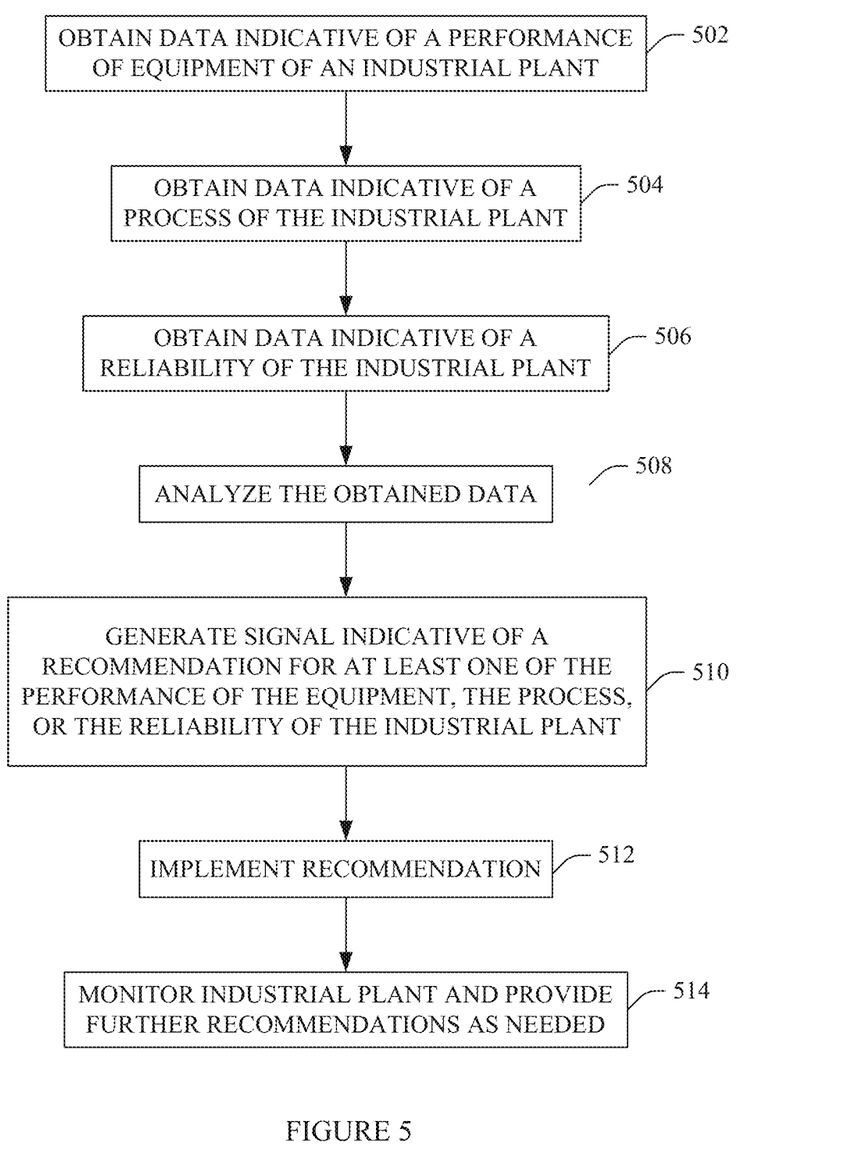
FIG. 5 illustrates an industrial plant process automation method for optimizing an industrial plant process.

FIG. 5 illustrates an industrial process automation method.

It is to be appreciated that the ordering of the acts in the methods described herein is not limiting. As such, other orderings are contemplated herein. In addition, one or more acts may be omitted and/or one or more additional acts may be included.

At 502, at least first data indicative of a performance of equipment of the industrial plant is obtained.

At 504, at least second data indicative of a process of the industrial plant is obtained.

At 506, at least third data indicative of a reliability of the industrial plant is obtained.

Optionally, data indicative energy usage of the industrial plant, an environmental characteristic of the industrial plant, a safety characteristic of the industrial plant, and/or other information about the plant.

At 508, the first, second and third data (and/or the optional data) are analyzed with respect to a predetermined metric of the industrial plant.

At 510, a signal indicative of a recommendation for at least one of use of the equipment or implementation of the process is generated based on a result of the analysis.

At 512, the recommendation is implemented for the industrial plant.

At 514, the industrial plant is monitored and further recommendations are provided as needed.

The above may be implemented by way of computer readable instructions, which when executed by a computer processor(s), cause the processor(s) to carry out the described techniques. In such a case, the instructions are stored in a computer readable storage medium associated with or otherwise accessible to the relevant computer.

Of course, modifications and alterations will occur to others upon reading and understanding the preceding description. It is intended that the invention be construed as including all such modifications and alterations insofar as they come within the scope of the appended claims or the equivalents thereof.

What is claimed is:

1. A method, comprising:
    obtaining at least first, second and third data corresponding to an industrial plant, wherein the first data is indicative of a performance of equipment of the industrial plant, the second data is indicative of a process of the industrial plant, and the third data is indicative of a reliability of the industrial plant;
    analyzing the first, second and third data with respect to a plurality of predetermined metrics of the industrial plant
    generating a signal that (1) is indicative of a primary recommendation for at least one of use of the equipment or implementation of the process by one or more configured computer processors based on a result of the analyzing, and (2) compares the primary recommendation and a secondary recommendation to a current state of each of the plurality of predetermined metrics, the primary recommendation having a different impact than the secondary recommendation on at least one metric of the plurality of predetermined metrics;
    implementing the primary recommendation or the secondary recommendation to adjust at least one of the use of equipment or the process of the industrial plant.

2. The method of claim 1, further comprising:
    obtaining fourth data indicative of energy usage of the industrial plant; and
    wherein analyzing includes the fourth data with respect to the plurality of predetermined metrics of the industrial plant.

3. The method of claim 2, further comprising:
    obtaining fifth data indicative of an environmental characteristic of the industrial plant; and
    wherein analyzing includes the fifth data with respect to the plurality of predetermined metrics of the industrial plant.

4. The method of claim 3, further comprising:
    obtaining sixth data indicative of a safety characteristic of the industrial plant;
    wherein analyzing includes the sixth data with respect to the plurality of predetermined metrics of the industrial plant.

5. The method of claim 1, wherein the first data is indicative of a performance of at least one of power supply equipment, power distribution equipment, control equipment and automation equipment of the industrial plant.

6. The method of claim 1, wherein the second data is indicative of downtime, production rate, control performance or product quality of the industrial plant.

7. The method of claim 1, wherein the signal includes information specific to the industrial plant.

8. The method of claim 7, wherein the industrial plant is a mineral mining plant.

9. The method of claim 1, further comprising:
    scanning the plant after implementation of the primary recommendation or the secondary recommendation, acquiring post-implementation data;
    generating a second signal indicative of a second primary recommendation for at least one of the maintenance of the equipment or the implementation of the process based on a result of analyzing of the post-implementation data;
    implementing the second primary recommendation for a least one of the maintenance of the equipment and the implementation of the process.

10. The method of claim 9, further comprising:
    tracking the implementation of the second primary recommendation.

11. The method of claim 1, wherein the first data is indicative of a performance of at least one of uptime, speed, efficiency, hardware component or a software revision of electrical equipment of the industrial plant.

12. The method of claim 1, wherein at least one of the primary and secondary recommendations includes maintenance improvement recommendations for at least one of equipment, process performance, or reliability.

13. The method of claim 12, wherein the maintenance improvement recommendation for the equipment includes a recommendation for at least one of training, preventive maintenance, emergency maintenance, predictive maintenance, life cycle strategy or support availability.

14. The method of claim 12, wherein the maintenance improvement recommendation for the process performance includes a recommendation for at least one of control effectiveness, rate, or downtime.

15. The method of claim 12, wherein the maintenance improvement recommendation for the reliability includes a recommendation for at least one of maintenance strategy or maintenance process.

16. The method of claim 1, wherein the current state of at least one of use of the equipment or implementation of the process includes an index profile of the industrial plant before implementation of the primary and secondary recommendations and forecasted index profiles of the industrial plant after the implementation of the primary or secondary recommendations.

17. A system, comprising:
    a data collector that obtains at least first, second and third data corresponding to an industrial plant, wherein the first data is indicative of a performance of equipment of the industrial plant, the second data is indicative of a process of the industrial plant, and third data is indicative of a reliability of the industrial plant;
    a data analyzer that analyzes the first, second and third data with respect to a plurality of predetermined metrics of the industrial plant;
    a recommender that includes one or more computer processors configured to generate a report indicating (1) a primary recommendation for at least one of maintenance of the equipment or improvement of the process performance based on a result of the analyzing, and (2) a comparison of the primary recommendation and a secondary recommendation in view of a current state of the plurality of predetermined metrics of the industrial plant, the primary recommendation having a different impact than the secondary recommendation on at least one metric of the plurality of predetermined metrics; and
    an output device configured to convey the report from the system to a resource of the industrial plant for selection and implementation to adjust the performance of at least one of the (1) equipment and (2) process of the industrial plant.

18. The system of claim 17, wherein the primary recommendation includes results from at least one of the data collector or the data analyzer.

19. The system of claim 18, wherein the primary recommendation is for at least one of plant maintenance improvements, plant process improvements, or plant reliability improvements, and wherein the system includes a console that is configured to receive the report and to output the report for at least one of (1) visual display on a display and (2) communication to a processor of at least some of the equipment.

20. The system of claim 17, wherein the data collector further collects one or more of data indicative of energy usage of the industrial plant, data indicative of an environmental characteristic of the industrial plant, or data indicative of a safety characteristic of the industrial plant.

21. The system of claim 17, wherein the first data is indicative of the performance of power, control and automation equipment of the industrial plant, and the second data is indicative of a downtime of the industrial plant.

22. The system of claim 17, further comprising:
a data scanner that scans the plant after implementation of the primary or secondary recommendations, acquiring post-implementation data and generates a second primary signal indicative of a second primary recommendation for at least one of the maintenance of the equipment or the implementation of the process based on a result of analyzing of the post-implementation data.

23. The system of claim 17, wherein the current state of at least one of use of the equipment or implementation of the process includes an index profile of the industrial plant before implementation of the primary and secondary recommendations and forecasted index profiles of the industrial plant after the implementation of the primary or secondary recommendations.

24. The system of claim 23, wherein the index profile includes at least one of a preventive maintenance strategy index, an emergency maintenance strategy index, a training index, predictive maintenance strategy index, life cycle strategy index, or support availability index by equipment class.

25. The system of claim 23, wherein the index profile includes at least one of a preventive maintenance strategy index, an emergency maintenance strategy index, a training index, predictive maintenance strategy index, life cycle strategy index, or support availability index by equipment type.

26. The system of claim 25, wherein the index profile provides at least one benchmark across at least one of plants, regions, or industries.

27. A non-transitory computer readable storage medium encoded with one or more computer executable instructions, which, when executed by a processor of a computing system, causes the processor to:
obtain at least first, second and third data corresponding to an industrial plant, wherein the first data is indicative of a performance of equipment of the industrial plant which include power supply equipment, power distribution equipment control equipment and automation equipment, the second data is indicative of a process of the industrial plant which processes ore to a product, and third data is indicative of a reliability of the industrial plant;
analyze the first, second and third data with respect to a plurality of predetermined metrics of the industrial plant;
generate a primary recommendation for at least one of the maintenance of the equipment, improvement of the process, or improvement of reliability based on a result of the analyzing;
generate a comparison of the primary recommendation and a secondary recommendation in view of a current state of the plurality of predetermined metrics of the industrial plant, the primary recommendation having a different impact than the secondary recommendation on at least one metric of the plurality of predetermined metrics; and
communicate the plurality of recommendations for selection and implementation to adjust the performance of at least one of the (1) equipment and (2) process of the industrial plant.

* * * * *